J. BUERCKY.
Broom.
No. 76,710.
Patented April 14, 1868.
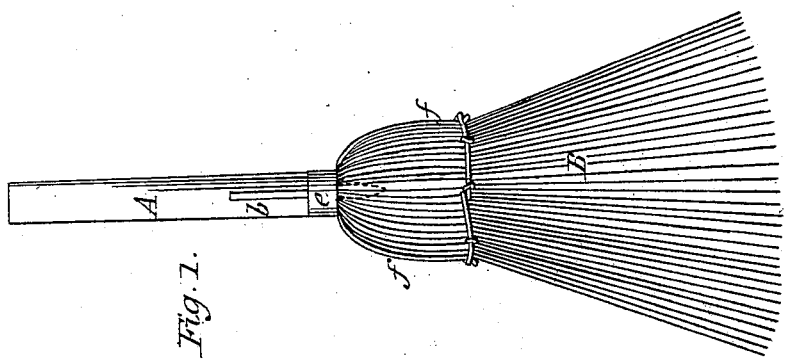
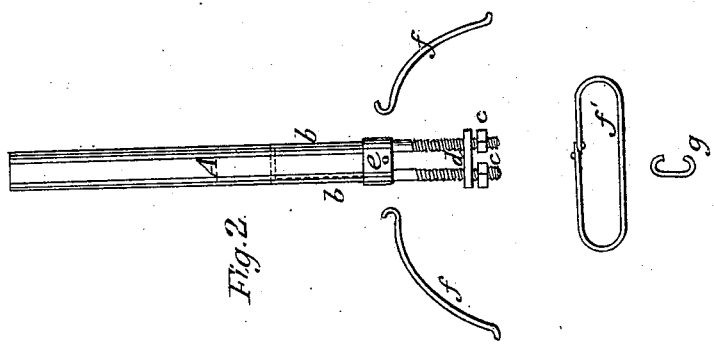
WITNESSES:
INVENTOR.

United States Patent Office.

JOHN BUERCKY, OF OVERPECK'S STATION, OHIO, ASSIGNOR TO HIMSELF AND JOHN C. BANDTEL, OF SAME PLACE.

Letters Patent No. 76,710, dated April 14, 1868.

IMPROVED BROOM.

*The Schedule referred to in these Letters Patent and making part of the same.*

TO ALL WHOM IT MAY CONCERN:

Be it known that I, JOHN BUERCKY, of Overpeck's Station, in Butler county, in the State of Ohio, have invented certain new and useful Improvements in Brooms; and I do hereby declare that the following is a full and exact description thereof, reference being had to the accompanying drawings, and to the letters of reference marked thereon.

Figure 1 represents my improved broom complete.

Figure 2 represents the parts, detached, which serve to secure the wisp to the handle.

The dotted lines in fig. 2 of the drawings indicate that a suitable hole is made in the wooden handle A, for the insertion of the iron rod $b\ b$, which is bent, and embedded in grooves in the handle, and the two ends extend beyond the lower end of the handle, as represented in the drawings. The projecting ends of rod $b$ have screw-threads formed thereon, with nuts $c\ c$, by which the loose link $d$ may be adjusted when the wisp is inserted to form the broom.

The ferrule $e$, on the end of the handle, is perforated at its lower edge, to admit the hooks of the bent wires $f\ f$ to be inserted. When the wires $f\ f$ are inserted in the holes in the ferrule $e$, and the band $f'$ is placed around the wisp B, the lower ends of wires $f\ f$ will be embraced by band or wire $f'$, and as the lower ends of wires $f\ f$ are slightly curved, they will retain the band in position, and at the same time the band will press the wires $f\ f$ against the wisp of the broom, so as to form a guard, and protect its shoulders from being injured by use. The wires also serve to give shape to the wisp, and to retain the broom in its proper relation to the handle. To retain the wisp in a flattened condition, the short clasp-hooks $g$ may be inserted through the wisp, and their ends will clasp the band or wire $f'$, as represented in fig. 1.

The broom is made by inserting the ends of the broom-corn or straw between the projecting ends of the rod $b\ b$, above the link $d$, an equal amount being inserted from each side through the opening formed by the parts above named; and thereupon the nuts $c\ c$ will be screwed up, forcing the loose link upward, to retain the broom-corn or straw in a compact condition. After inserting the ends of a sufficient quantity of straw within the aperture, above the link $d$, to form the wisp, the straw will be bent downwards, and the band can be placed around the mass. The wires $f\ f$ and clasps $g$ will also be placed in the positions indicated, to give form to and retain the wisp in proper position and relation to the handle.

Besides the cheapness of construction and facility with which my improved broom can be made, it presents the advantage of free ventilation, or exposure of the mass of brush to the open air, and consequently will not be so liable to decay when exposed to humidity as that class of brooms secured in broom-heads made of a continuous sheet of metal.

Having fully described my invention, what I claim, and desire to secure by Letters Patent, is—

The combination of the rod $b\ b$, link $d$, nuts $c\ c$, bent wires and band $f\ f'$ and $g$, with the perforated ferrule $e$ and handle A, when the parts are constructed, arranged, and applied for securing the wisp B, in the manner and for the purpose described.

In testimony whereof, I have hereunto set my hand, this 16th day of November, 1867.

JOHN BUERCKY.

Witnesses:
H. P. K. PECK,
JAMES BOWMAN.